US012754392B2

(12) United States Patent
Moradian et al.

(10) Patent No.: US 12,754,392 B2
(45) Date of Patent: Oct. 6, 2026

(54) PROCESS CHAMBER WITH REFLECTOR

(71) Applicant: Applied Materials, Inc., Santa Clara, CA (US)

(72) Inventors: Ala Moradian, Sunnyvale, CA (US); Amir H. Tavakoli, San Jose, CA (US); Peter Reimer, Santa Clara, CA (US); Shu-Kwan Lau, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 842 days.

(21) Appl. No.: 17/971,494

(22) Filed: Oct. 21, 2022

(65) Prior Publication Data

US 2024/0134151 A1 Apr. 25, 2024
US 2024/0231042 A9 Jul. 11, 2024

(51) Int. Cl.
*G02B 7/18* (2021.01)

(52) U.S. Cl.
CPC .................................. *G02B 7/1815* (2013.01)

(58) Field of Classification Search
None
See application file for complete search history.

(56) References Cited

U.S. PATENT DOCUMENTS

| | | | | |
|---|---|---|---|---|
| 4,838,629 A * | 6/1989 | Maruyama | F21V 9/04 359/359 |
| 2008/0226272 A1* | 9/2008 | Kasai | H01L 21/67115 700/121 |
| 2008/0264072 A1* | 10/2008 | Miyoshi | F17C 9/02 62/48.1 |
| 2009/0017217 A1 | 1/2009 | Hass et al. | |
| 2012/0145697 A1 | 6/2012 | Komatsu et al. | |
| 2015/0184313 A1* | 7/2015 | Yoshitake | C30B 25/10 118/712 |
| 2016/0289835 A1* | 10/2016 | Kuh | C23C 16/481 |
| 2016/0348276 A1* | 12/2016 | Lau | C30B 25/08 |
| 2019/0194810 A1 | 6/2019 | Shah et al. | |
| 2019/0292676 A1* | 9/2019 | Lin | C08J 7/044 |

FOREIGN PATENT DOCUMENTS

| | | |
|---|---|---|
| CN | 111508872 A | 8/2020 |
| JP | H10-116793 A | 5/1998 |
| JP | 2007-536726 A | 12/2007 |
| JP | 2008-182180 A | 8/2008 |

(Continued)

OTHER PUBLICATIONS

International Search Report and Written Opinion for Application No. PCT/US2023/017763 dated Jul. 21, 2023.

(Continued)

*Primary Examiner* — Jeffrie R Lund
*Assistant Examiner* — Tiffany Z Nuckols
(74) *Attorney, Agent, or Firm* — Patterson + Sheridan, LLP

(57) ABSTRACT

A reflector and processing chamber having the same are described herein. In one example, a reflector is provided that includes cylindrical body, a cooling channel, and a reflective coating. The cylindrical body has an upper surface and a lower surface. The lower surface has a plurality of concave reflector structures disposed around a centerline of the cylindrical body. The cooling channel disposed in or on the cylindrical body. The reflective coating is disposed on the plurality of concave reflector structures.

17 Claims, 8 Drawing Sheets

(56) References Cited

FOREIGN PATENT DOCUMENTS

| | | | |
|---|---|---|---|
| JP | 2009-200330 | A | 9/2009 |
| JP | 2013-058627 | A | 3/2013 |
| JP | 2015-126185 | A | 7/2015 |
| JP | 2018-29181 | A | 2/2018 |
| JP | 2018-517299 | A | 6/2018 |
| JP | 2021-17647 | A | 2/2021 |
| JP | 2021-507112 | A | 2/2021 |
| JP | 2022-43074 | A | 3/2022 |
| KR | 2008-0058488 | A | 6/2008 |
| TW | 201128708 | A | 8/2011 |
| TW | 201704526 | A | 2/2017 |
| WO | 2011/021549 | A1 | 2/2011 |
| WO | 2014-151867 | A1 | 9/2014 |

OTHER PUBLICATIONS

Korean Office Action for Application No. 10-2025-7015788 dated Feb. 23, 2026.
Japanese Office Action for Application No. 2025-521485 dated Mar. 10, 2026.
Office Action from Taiwanese Patent Application No. 112113838, dated Jul. 16, 2026.

* cited by examiner

PROCESS CHAMBER WITH REFLECTOR

BACKGROUND

Field

Embodiments described herein generally relate to a semiconductor process chamber. More specifically, embodiments of the disclosure relate to a semiconductor process chamber having one or more reflectors.

Description of the Related Art

In the fabrication of integrated circuits, deposition processes are used to deposit films of various materials upon semiconductor substrates. These deposition processes may take place in an enclosed process chamber. Epitaxy is a deposition process that grows a thin, ultra-pure layer, usually of silicon or germanium on a surface of a substrate. Forming an epitaxial layer on a substrate with uniform thickness across the surface of the substrate requires precise temperature control. Process temperature is controlled through the use of radiant heat lamps. Each lamp is typically associated with one or more reflectors that increases and directs the light energy to the substrate. The lamps and reflectors are often replaced, and thus, are a significant contributor to the operating cost of the processing chamber. The reflectors are also difficult to manufacture.

Thus, there is a need for an improved reflector for a process chamber that utilizes lamps for heating.

SUMMARY

A reflector and processing chamber having the same are described herein. In one example, a reflector is provided that includes cylindrical body, a cooling channel, and a reflective coating. The cylindrical body has an upper surface and a lower surface. The lower surface has a plurality of concave reflector structures disposed around a centerline of the cylindrical body. The cooling channel disposed in or on the cylindrical body. The reflective coating is disposed on the plurality of concave reflector structures.

In another example, a processing chamber applicable for use in semiconductor manufacturing includes a chamber body, a plurality of lamps, a substrate support, a support surface, a window, a reflector including a cylindrical body, a plurality of concave reflector structures, a cooling channel, and a reflective coating. The chamber body having an internal volume. The substrate support disposed in the internal volume. The window disposed over the substrate support and at least partially bounding the internal volume. The reflector positioned to reflect light emitted from the lamps through the window and into the internal volume. The cylindrical body having an upper surface and a lower surface. The lower surface having a plurality of concave reflector structures disposed around a centerline of the cylindrical body. The cooling channel disposed in or on the cylindrical body. The reflective coating disposed on the plurality of concave reflector structures.

In another example, a processing chamber applicable for use in semiconductor manufacturing includes a chamber body, a plurality of lamps, a substrate support, a window, a reflector including cylindrical body, an upper surface and a lower surface, a plurality of concave reflector structures, a shell, a baffle, a cooling channel, a second cooling channel, a side surface, a reflective coating. The chamber body having an internal volume. The substrate support disposed in the internal volume. The substrate support includes a support surface. The window is disposed over the substrate support and at least partially bounding the internal volume. The reflector is positioned to reflect light emitted from the lamps through the window and into the internal volume. The cylindrical body having an upper surface and a lower surface. The lower surface having a plurality of concave reflector structures disposed around a centerline of the cylindrical body. The cylindrical body is made from a polymer. The shell extends through the cylindrical body and projects below the lower surface to a distal end. The shell is made from a second polymer where the first and second polymer is combined with a filler that improves thermal conductivity of the polymer. The filler includes one or more of boron nitride, aluminum nitride, silicon carbide, carbon-based structures, diamond, or metal powder. The baffle is coupled to the distal end of the shell. The cooling channel is disposed in or on the cylindrical body having an inlet and an outlet port disposed through the upper surface or a side surface of the cylindrical body and shell. The second cooling channel disposed in or on the shell having an inlet and an outlet port disposed through the upper surface or a side surface of the cylindrical body and shell. The reflective coating disposed on the plurality of concave reflector structures. The reflective coating is gold or aluminum.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
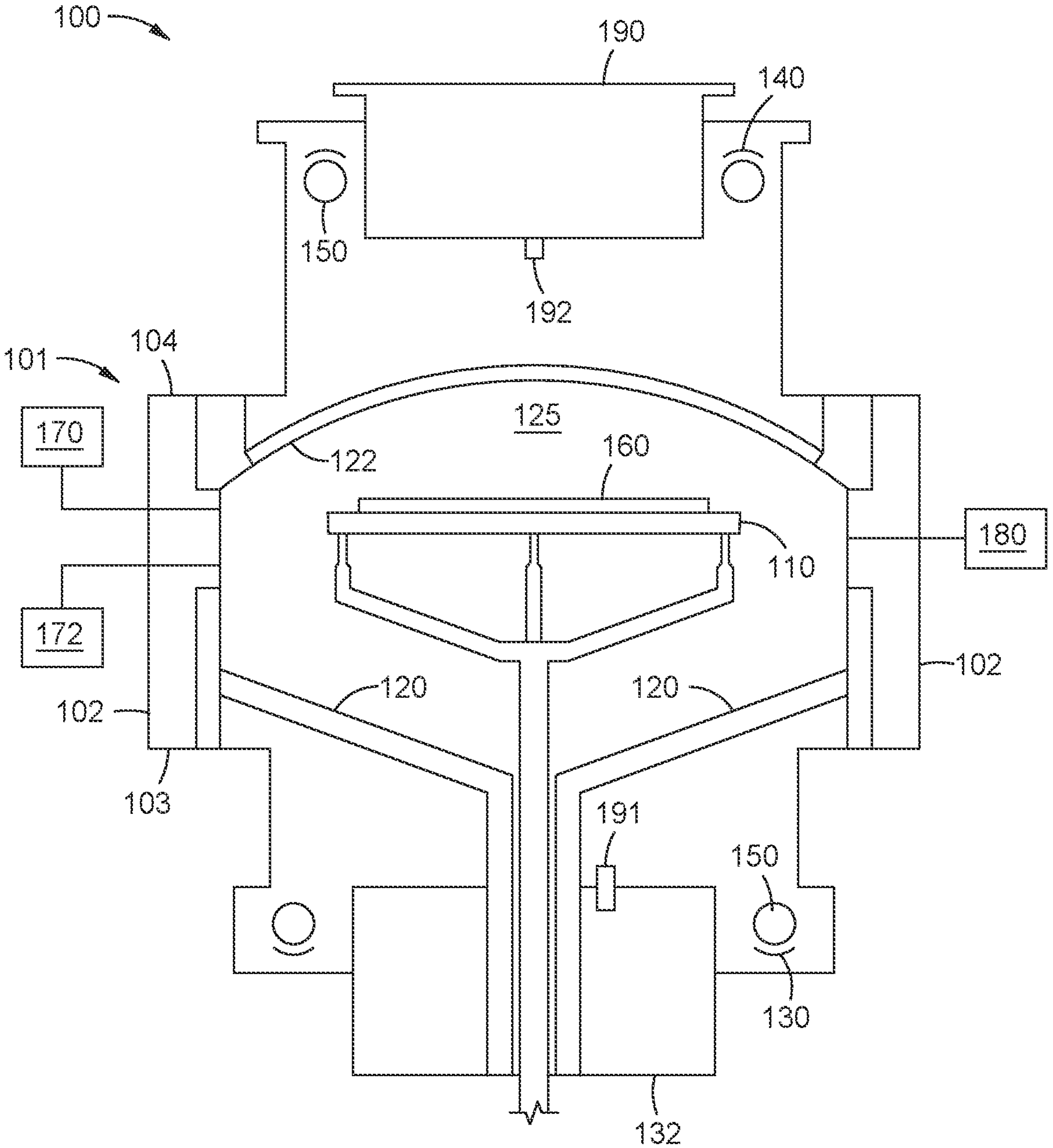
FIG. 1 is a side sectional view of a process chamber, according to one embodiment of the disclosure.

In this disclosure, the terms “top”, “bottom”, “side”, “above”, “below”, “up”, “down”, “upward”, “downward”, “horizontal”, “vertical”, and the like do not refer to absolute directions. Instead, these terms refer to directions relative to a non-specific plane of reference. This non-specific plane of reference may be vertical, horizontal or other angular orientation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally relate to a reflector for use in a semiconductor process chamber, and a semiconductor process chamber having the same. The reflector is generally fabricated from a polymer and has a reflective coating disposed on a plurality of concave surfaces formed in one side of the reflector.

Conventional light reflectors disposed on a processing chamber are generally fabricated from a metal, such as aluminum. These aluminum reflectors are coated with a reflective coating that directs infrared light emitted by a lamp to a substrate disposed within the process chamber. However, machining these aluminum reflectors is time intensive, costly, may delay operations should a replacement be required. The disclosure below is a nonmetallic reflector body, coated with a reflective material which provides a significant improvement over the aluminum reflectors. The nonmetallic based reflector provides flexibility in construction, including, reflectivity layer selecting, and nonmetal material selection which may lead to faster reproduction of spare parts and less processing chamber downtime. Moreover, the nonmetallic based reflector can include integrated cooling for improved performance and longer service life. The nonmetallic based reflector can also include integrated light baffles that reduce the number of components needed to operate the chamber, and also simplifies the supply chain and amount of components needed to be inventoried to adequately service the processing chamber.

Turning now to the side sectional view of a process chamber 100 illustrated in FIG. 1, the process chamber 100 can be used to deposit epitaxial films on a substrate 160. The process chamber 100 can operate under vacuum, such as, at reduced pressures or near atmospheric pressure. The process chamber 100 includes a chamber body 101 having one or more side walls 102, a bottom 103, and a top 104. An upper dome 122 and a lower dome 120 are coupled to the chamber body 101, and together enclose an internal volume 125 of the process chamber 100.

The process chamber 100 further includes a substrate support 110 disposed in the internal volume 125 of the chamber body 101 to support the substrate 160 during processing. The substrate 160 disposed on the substrate support 110 is heated by lamps 150. The lamps 150 are disposed above and/or below the substrate support 110. The lamps 150 can be, for example, tungsten filament lamps or high power LEDs. The lamps 150 below the substrate support 110 can direct radiation, such as infrared radiation, through the lower dome 120 disposed below the substrate support 110 to heat the substrate 160 and/or the substrate support 110. The lower dome 120 is made of a transparent material, such as quartz. In some embodiments, a substrate support 110 having a ring shape may be used. A ring-shaped substrate support can be used to support the substrate 160 around the edges of the substrate 160, so that the bottom of the substrate 160 is directly exposed to the heat from the lamps 150. In other embodiments, the substrate support 110 is a heated susceptor to increase temperature uniformity of the substrate 160 during processing. The lamps 150 below the substrate support 110 can be installed within or adjacent to a lower reflector 130 and within or adjacent to a lower shell assembly 132. The lower reflector 130 can surround the lower shell assembly 132. Generally, the lower reflector 130 and the lower shell assembly 132 can be formed of a polymer, coated with a reflective material, such as, for example, gold, aluminum or other suitable material. A lower temperature sensor 191, such as a pyrometer, can be installed in the lower shell assembly 132 to detect a temperature of the substrate support 110 or the back side of the substrate 160. Alternatively, one or both of the lower reflector 130 and the lower shell assembly 132 may be fabricated as later described below with reference to an upper shell assembly 190 and an upper reflector 140.

The lamps 150 above the substrate support 110 can direct radiation, such as infrared radiation, through the upper dome 122 disposed above the substrate support 110. The upper dome 122 is made of a transparent material, such as quartz. The lamps 150 above the substrate support 110 can be installed adjacent to the upper shell assembly 190 and within or adjacent to an upper reflector 140. The upper reflector 140 can surround the perimeter of the upper shell assembly 190. Generally, the upper reflector 140 and the upper shell assembly 190 can be formed of polymer coated with a reflective material, such as, for example, gold, aluminum or other suitable material. An upper temperature sensor 192, such as a pyrometer, can be installed in or adjacent to the upper shell assembly 190 to detect a temperature of the substrate 160 during processing. Although FIG. 1 shows the same size lamp 150 installed above and below the upper and lower dome, 122, and 120 respectively, different types, intensity, wavelength, and/or sizes of lamps may be installed within or adjacent to one or more of the reflectors 130, 140. Additionally, lamps 150 may be disposed in additional and/or alternative locations.

The upper reflector 140, the lower reflector 130, the upper shell assembly 190, and the lower shell assembly 132 can be manufactured by processes such as, but not limited to, casting, injection molding, compression molding (e.g., pressed powder), and 3D printing (additive manufacturing). One, some or all of the upper reflector 140, the lower reflector 130, the upper shell assembly 190, and the lower shell assembly 132 have a reflective coating suitable for directing light toward the substrate 160 or away from a location where light is undesired. The reflective coating may be, but is not limited to, reflective materials such as, gold and aluminum, among others. The reflective coating may include a transparent protective layer, such as a protective magnesium fluoride layer, disposed over the reflective materials. The reflective coating may optionally include an underlying adhesion layer, such as nickel. In one example, the reflective coating is a gold layer having a thickness of about 50 nm to about 300 nm and high reflectivity for infra-red wavelength (about 700 nm to 1 mm). A gold reflective coating may have a reflectance of 90% or more. In another example, the reflective coating is an aluminum layer having a thickness of about 50 nm to about 300 nm. When present, the magnesium fluoride layer protection layer may be about 20 nm to about 1 μm thick. The resulting reflective coating may have a reflectance of 90% or more. In all embodiments, the thickness of the coatings is selected such that the reflectance of the cylindrical body is 90% or more.

The upper reflector 140, the lower reflector 130, the upper shell assembly 190, and the lower shell assembly 132 can be manufactured by polymer materials such as, but not limited to, polyether ether ketone (PEEK), polyimide, or other suitable high temperature polymers. All, some or none of the upper reflector 140, the lower reflector 130, the upper shell assembly 190, and the lower shell assembly 132 may be manufactured from the same material, as similarly, all, some or none of the upper reflector 140, the lower reflector 130, the upper shell assembly 190, and the lower shell assembly 132 may be have the same coating.

The process chamber 100 is coupled to one or more process gas sources 170 that supply the process gases used in the epitaxial depositions. The process chamber 100 is further coupled to an exhaust device 180, such as a vacuum pump. In some embodiments, the process gases can be supplied on one side (e.g., the left side of FIG. 1) of the process chamber 100 and gases may be exhausted from the process chamber on an opposing side (e.g., the right side of FIG. 1) to create a cross flow of process gases above the substrate 160. The process chamber 100 may also be coupled to a purge gas source 172.

Figure 2A:
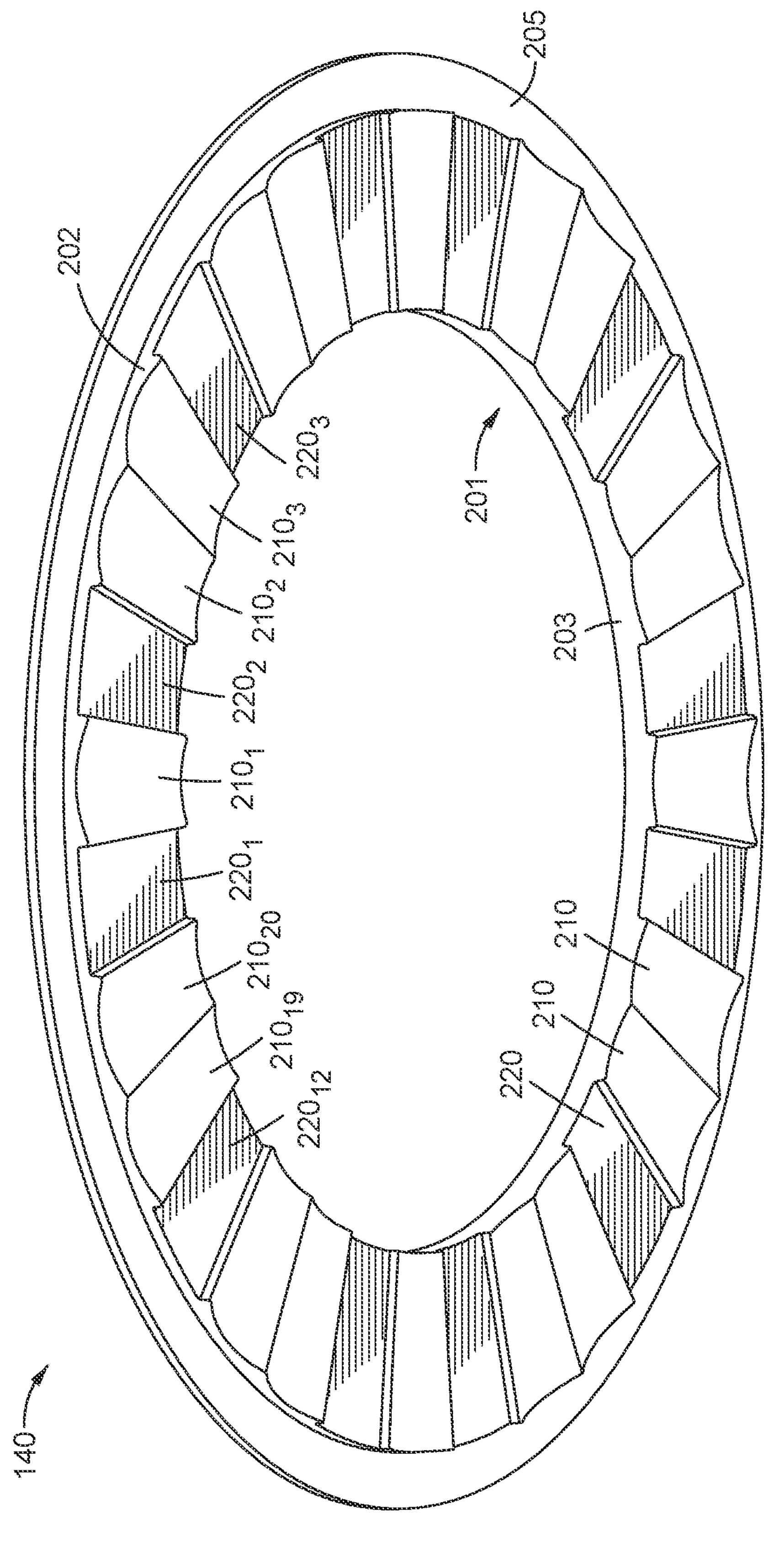
FIG. 2A is a bottom perspective view of a reflector to be used in the process chamber of FIG. 1, according to one embodiment of the disclosure.
Figure 2B:
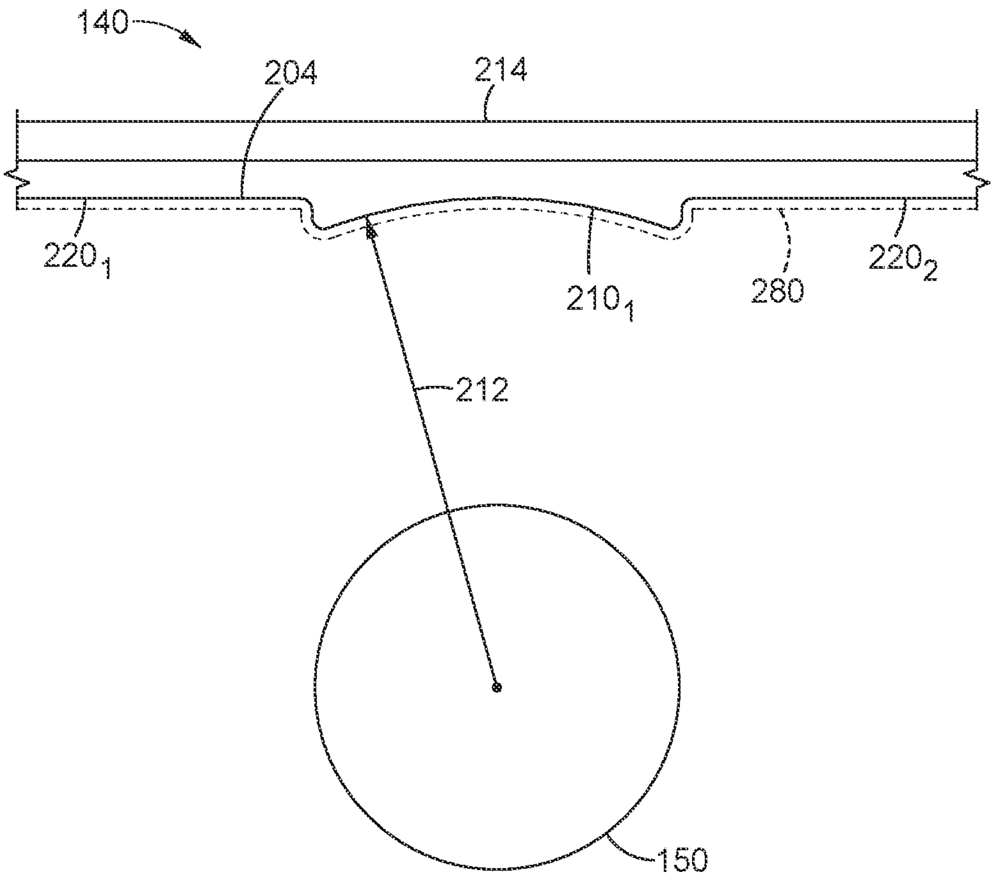
FIG. 2B is a partial side sectional view of the reflector of FIG. 2A, according to one embodiment of the disclosure.

FIGS. 2A-2B are a bottom and partial side sectional views of the upper reflector 140 of FIG. 1, according to one embodiment of the disclosure. The upper reflector 140 includes an annular body 201 (also referred to as the "cylindrical body") having an outer edge 202, an inner edge 203, a top side 214, and a bottom side 204. The upper reflector 140 further includes an outer rim 205 disposed above and outward of the bottom side 204 of the annular body 201. In one embodiment, the cylindrical body may be a ring shaped body with a center opening as shown in FIG. 2A. In some embodiments, the outer rim 205 can be used to align the upper shell assembly 190 to the processing chamber. The bottom side 204 includes a plurality of concave reflector structures, which include first reflecting surfaces 210. The bottom side 204 also includes a plurality of second reflecting surfaces 220, which may be flat or concave. The first reflecting surfaces 210 and the second reflecting surfaces 220 include a reflective coating 280 made from a highly reflective material, such as gold, aluminum, or other material suitable to reflect the radiation from the lamps 150 in the process chamber 100. The second reflecting surfaces 220 have surface shading to further distinguish the second reflecting surfaces 220 from the first reflecting surfaces 210. Each first reflecting surface 210 and each second reflecting surface 220 is positioned at a different angular location relative to a centerline of the annular body 201. In some embodiments, the upper shell assembly 190 includes from about 16 to about 24 first reflecting surfaces 210, such as about 20 first reflecting surfaces 210. FIG. 2A is shown with 20 first reflecting surfaces 210 (see $\mathbf{210}_{20}$). In some embodiments, the upper shell assembly 190 includes from about 8 to 16 second reflecting surfaces 220, such as about 12 second reflecting surfaces 220. FIG. 2A is shown with 12 second reflecting surfaces 220 (see 22012).

The partial side sectional view of FIG. 2B illustrates the reflecting surfaces $\mathbf{220}_1$, $\mathbf{210}_1$, and $\mathbf{220}_2$ relative to the lamp 150. The lamps 150 are disposed between the first reflecting surfaces 210 and the upper dome 122 of the process chamber 100 (i.e., between the first reflecting surfaces 210 and the substrate support 110). In some embodiments, the lamps 150 are not placed between the second reflecting surfaces 220 and the substrate support 110. For example, if the lamps 150 are only placed beneath the first reflecting surfaces 210, then 20 lamps 150 would be placed beneath the upper reflector 140 that includes 20 first reflecting surfaces 210.

The plurality of concave reflector structures (e.g., the first reflecting surfaces 21) are disposed around the annular body 201 in a circular array relative to a centerline of the cylindrical body. At least one of the first reflecting surfaces 210 is disposed between each second reflecting surface 220 in the circular array. The circular array can include one or more instances in which two or more first reflecting surfaces are arranged consecutively. For example, the circular array of the upper reflector 140 includes eight instances of two first reflecting surfaces 210 spaced consecutively. Furthermore, the circular array includes four instances in which one of the second reflecting surfaces 220 is disposed one position before and one position after one of the first reflecting surfaces 210.

Each first reflecting surface 210 has a curved surface having a radius of curvature 212 from about 1.50 inches to about 2.20 inches, such as from about 2.02 inches to about 2.10 inches. On the other hand, each second reflecting surface 220 is substantially flat. In some embodiments, each first reflecting surface 210 has a partial cylindrical shape extending in a radial direction from the outer edge 202 towards the inner edge 203 of the upper reflector 140. In other embodiments, each first reflecting surface has a frustoconical shape extending in a direction from the outer edge 202 towards the inner edge 203 of the upper reflector 140. In embodiments having a frustoconical shape, the radius of curvature decreases in the radial direction from the outer edge 202 to the inner edge 203 of the reflector 140.

Figure 3A:
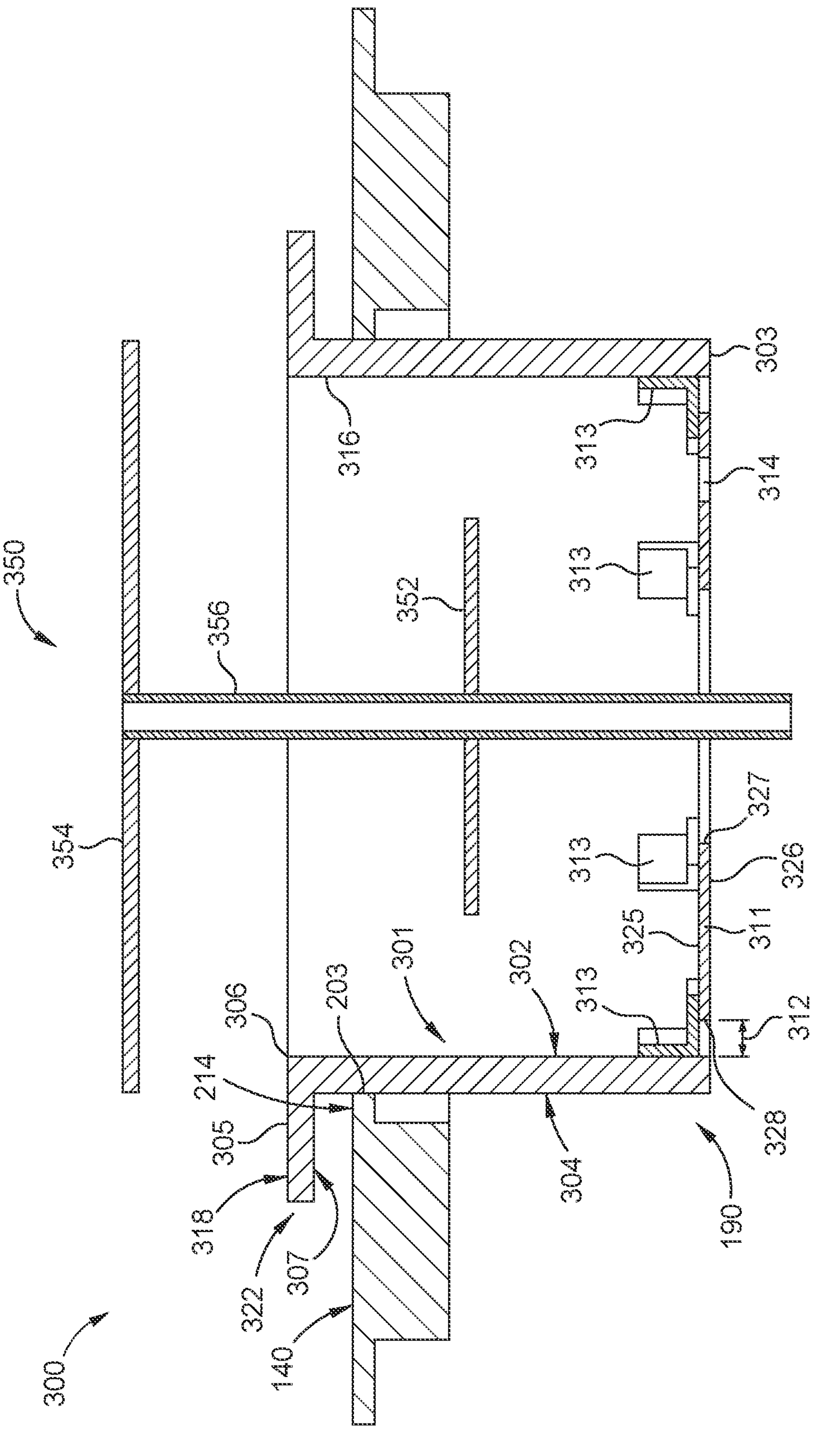
FIG. 3A is cross sectional view of a reflector assembly

FIG. 3A illustrates the cross sectional view of a reflector assembly 300. While the foregoing will discuss an embodiment of an upper reflector assembly, it should be understood, the same construction may apply to the lower reflector 130 introduced above. The reflector assembly 300 includes the upper shell assembly 190, the upper reflector 140, and a baffle structure 350. The upper shell assembly 190 includes a shell body 301, and a shell flange 305. The shell body 301 has a cylindrical shape with an inner diameter surface 302, and an outer diameter surface 304, a proximate end 316, and a distal end 303. The shell flange 305 has an upper surface 318, a lower surface 307, an inner diameter edge 306, and an outer diameter edge 322 that extends radially outward from the inner diameter surface 302 of the shell body 301. The shell flange 305 is connected to the proximate end 316 of the shell body 301 at the inner diameter edge 306 as a one piece monolithic structure. The upper shell assembly 190 may have an optional lower baffle 311 located at the distal end 303 of the shell body 301. The lower baffle 311 may be disk-shaped having a top and bottom surface, 325, 326, respectively, with an inner edge 327, and an outer edge 328. The lower baffle 311 may be a separate component connected to the shell body 301, or be connected to the distal end 303 of the shell body 301 as a one piece monolithic structure The baffle structure 350 includes a middle baffle 352, a top baffle 354, and a cylindrical sensor tube 356. The middle baffle 352 and the top baffle 354 have a disk shape and are disposed around a common centerline of the cylindrical sensor tube 356. The baffle structure 350 may be constructed of the same material as the upper reflector 140, or other suitable material, such as aluminum.

The lower baffle 311 may be connected to the inner diameter surface 302 of the shell body 301. The top surface 325 of the lower baffle 311 may be connected to the inner diameter surface 302 by connectors 313 in a manner that creates an annular gap 312 between the inner diameter surface 302 and the outer edge 328. The connector 313 may be a bracket or structure suitable for connecting the lower baffle 311 to the shell body 301. In another embodiment, the connectors 313 are a web of material extending between the outer edge 328 of the lower baffle 311 and the inner diameter surface 302 at the distal end 303 of the shell body 301 when the shell body 301 and lower baffle 311 are fabricated as a monolithic structure. Furthermore, it is contemplated the upper shell assembly 190, including the optional lower baffle 311 and baffle structure 350, are formed as a monolithic structure. The lower baffle 311 is constructed of the same material as the upper reflector 140 and coated similarly. Furthermore, the lower baffle 311 may have a cut out 314 that enables a second temperature sensor, for example a pyrometer not shown, to have a line of sight down to the edge of the substrate 160. The cylindrical sensor tube 356 is generally utilized to provide a line of sight for a first temperature sensor, for example the upper temperature sensor 192 shown in FIG. 1, down to the center of the substrate 160.

The shell assembly 190, including the lower baffle 311, may be constructed of the same material as the upper reflector 140 and coated similarly. The shell assembly 190 is configured to be inserted adjacent to the inner edge 203 of the upper reflector 140. The outer diameter of shell flange 305 is greater than the inner diameter of the inner edge 203 of the upper reflector 140 causing a lower surface 307 of the shell flange 305 to make at least partial contact with the top side 214 of the upper reflector 140 when inserted within the cylindrical body of the upper reflector 140.

Figure 3B:
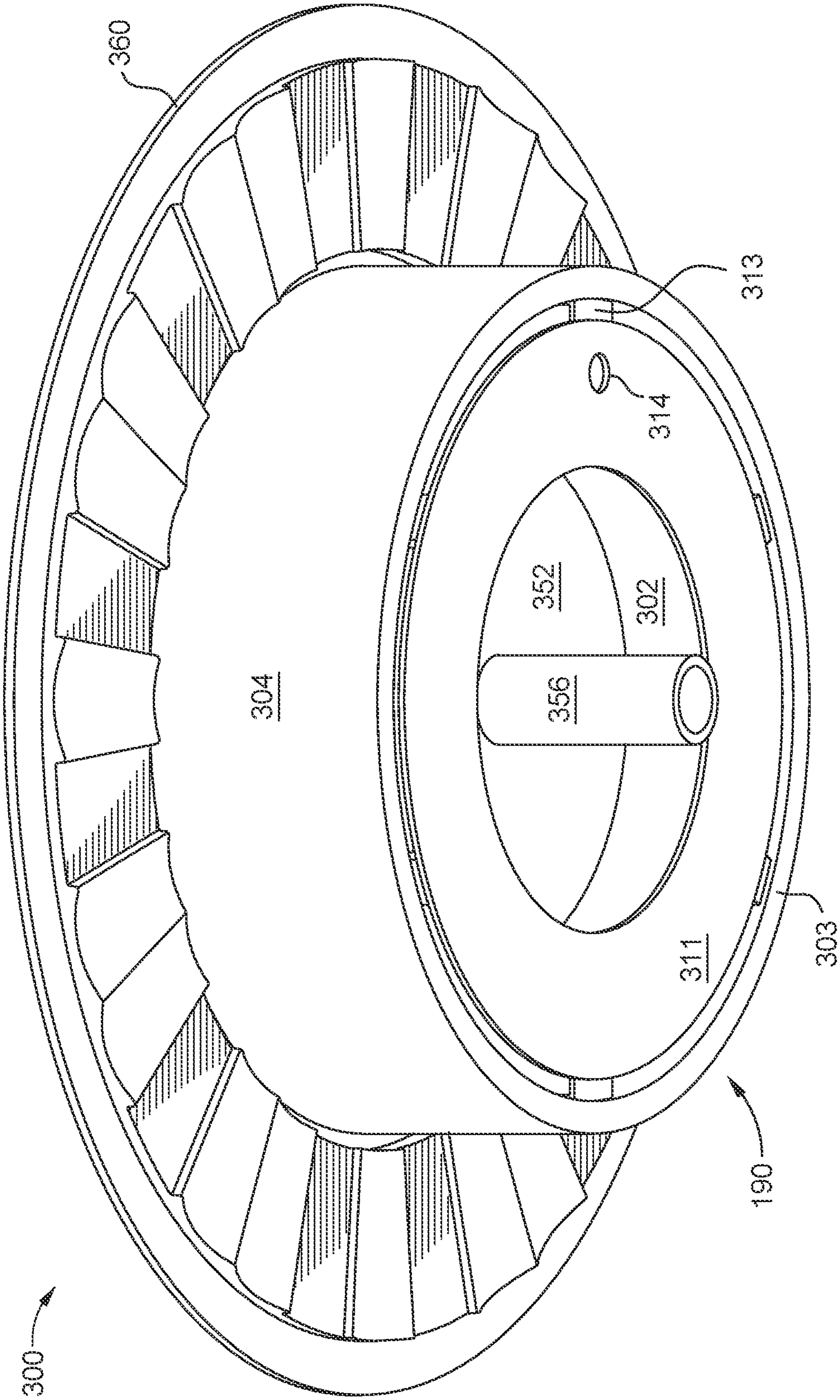
FIG. 3B is a bottom perspective view of reflector assembly of FIG. 3A, according to one embodiment of the disclosure.

FIG. 3B is an exemplary bottom perspective view of an embodiment of the reflector assembly 300 including the upper shell assembly 190, the upper reflector 140, and the baffle structure 350. The reflector assembly 300 may be used in place of the upper reflector 140 described above in the process chamber 100, or other suitable processing chamber. The cylindrical body 360 is configured similar to the upper reflector 140 described above, except that the cylindrical body 360 is interfaced with at least the shell body 301 to reduce unwanted reflections from disturbing measuring equipment, such as the upper temperature sensor 192 through cylindrical sensor tube 356.

As previously mentioned, nonmetals may be used to manufacture the reflector assembly 300. The nonmetallic or polymer body with reflective coating may be used on other components disposed on or within the chamber body that receive light or heat from lamp 150. These nonmetal or polymer bodies are exposed to high temperature during operation of the process chamber 100 of FIG. 1. The temperature of the nonmetals or polymers are selected to withstand up to 450 degree Celsius. Some nonmetal or polymer bodies may withstand up to 500 degree Celsius. To manage the temperature of the reflector assembly and prevent overheating, the nonmetallic materials may include fillers selected to improve thermal conductivity. Some fillers that may be used to improve thermal conductivity include but are not limited to boron nitride, aluminum nitride, silicon carbide, carbon, diamond, and metal powders including aluminum, iron, carbon nanotubes or similar carbon-based structures such as carbon fiber or graphene. In one example, nonmetal or polymer bodies may include up to about 7 weight percent fillers.

Figure 4:
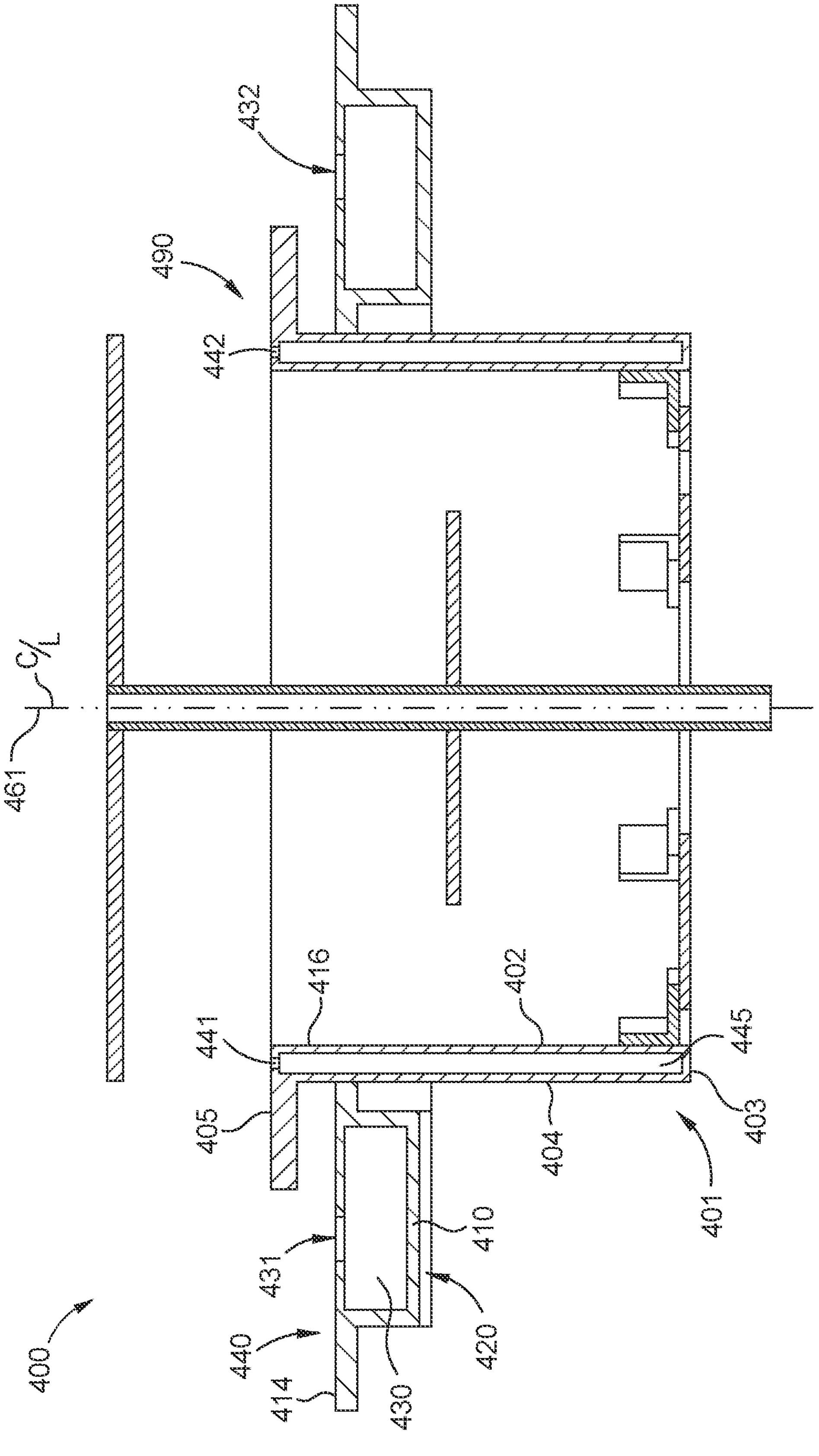
FIG. 4 is a cross sectional view of a reflector assembly with cooling channels, according to one embodiment of the disclosure

FIG. 4 illustrates a cross sectional view of a reflector assembly 400 with added cooling channels within components of the reflector assembly 400. It is contemplated that the illustrated cooling channels may be similarly constructed in the designs of FIGS. 2A-6. The reflector assembly 400 includes an upper reflector 440 and the shell assembly 490 each possessing a cooling channel around a centerline 461. The diameter of cylindrical, annular, tube-like, or ring shaped components use the centerline 461 as the origin. The upper reflector 440 and the shell assembly 490 are contemplated to be constructed from various methods for suitable plastic forming and coated similar to the reflector assembly 300. For example, but not limited to, an injection mold used to form the upper reflector 440 results in a cavity 430 within the annular body 410. The cavity 430 may be used to flow a cooling medium such as air, water, fluorinated heat transfer fluid, or some combination thereof to maintain the temperature of the reflector assembly 400 below the destruction temperature of the reflective coating 280, the annular body 410, or the lamps 150 of FIGS. 2B, 4, and 1, respectively. In one embodiment, the cavity 430 is formed near a top side 414 of annular body 410 and recessed from the plurality of the concave structures 420. In another embodiment, the cavity 430 is formed near the plurality of the concave structures 420 and recessed from the top side 414 of annular body 410. In another embodiment, the cavity 430 substantially encompasses the height of the annular body 410 formed near the plurality of the concave structures 420 and near the top side 414. The cavity 430 may be a single annular enclosure that follows the annular body 410 disk shape. In another embodiment, the cavity 430 may be a divided annular enclosure containing multiple flow paths that follow the disk shape of the annular body 410. In one embodiment, the top side 414 has a reflector inlet port 431 and a reflector outlet port 432. In another embodiment, the ports 431, 432 maybe side entry and exit ports. In yet another embodiment, the cavity 430 may be dispose on top of the top side 414 enabling cooling from the surface. The ports 431, 432 are used to allow flow to ingress and egress from the cavity 430. FIG. 4 illustrates the reflector inlet port 431 and the reflector outlet port 432 positioned 180 degrees from each other. It is contemplated that the spacing between the reflector inlet port 431 and the reflector outlet port 432 may be substantially next to each other or some distance in between.

Similarly, the shell assembly 490 comprises a shell flange and a shell body 401 that contains a formed cavity 445 between the shell body 401 inner wall 402, an outer wall 404, a distal end 403, and a proximate end 416. A cavity 445 is formed between the inner and outer wall where a cooling medium may be provided to thermally regulate the shell body 401 and prevent overheating. The cavity 445 has a shell inlet port 441 and a shell outlet port 442. The ports 441, 442 allow the flow to ingress and egress of the cooling medium from the cavity 445. FIG. 4 illustrates the shell inlet port 441 and the shell outlet port 442 positioned 180 degrees from each other however it is contemplated that the spacing between the shell inlet port 441 and the shell outlet port 442 may be substantially next to each other or some distance in-between. Furthermore, in another embodiment, the shell inlet port 441 and the shell outlet port 442 may be side entry or exit ports of the shell assembly 490.

Figure 5:
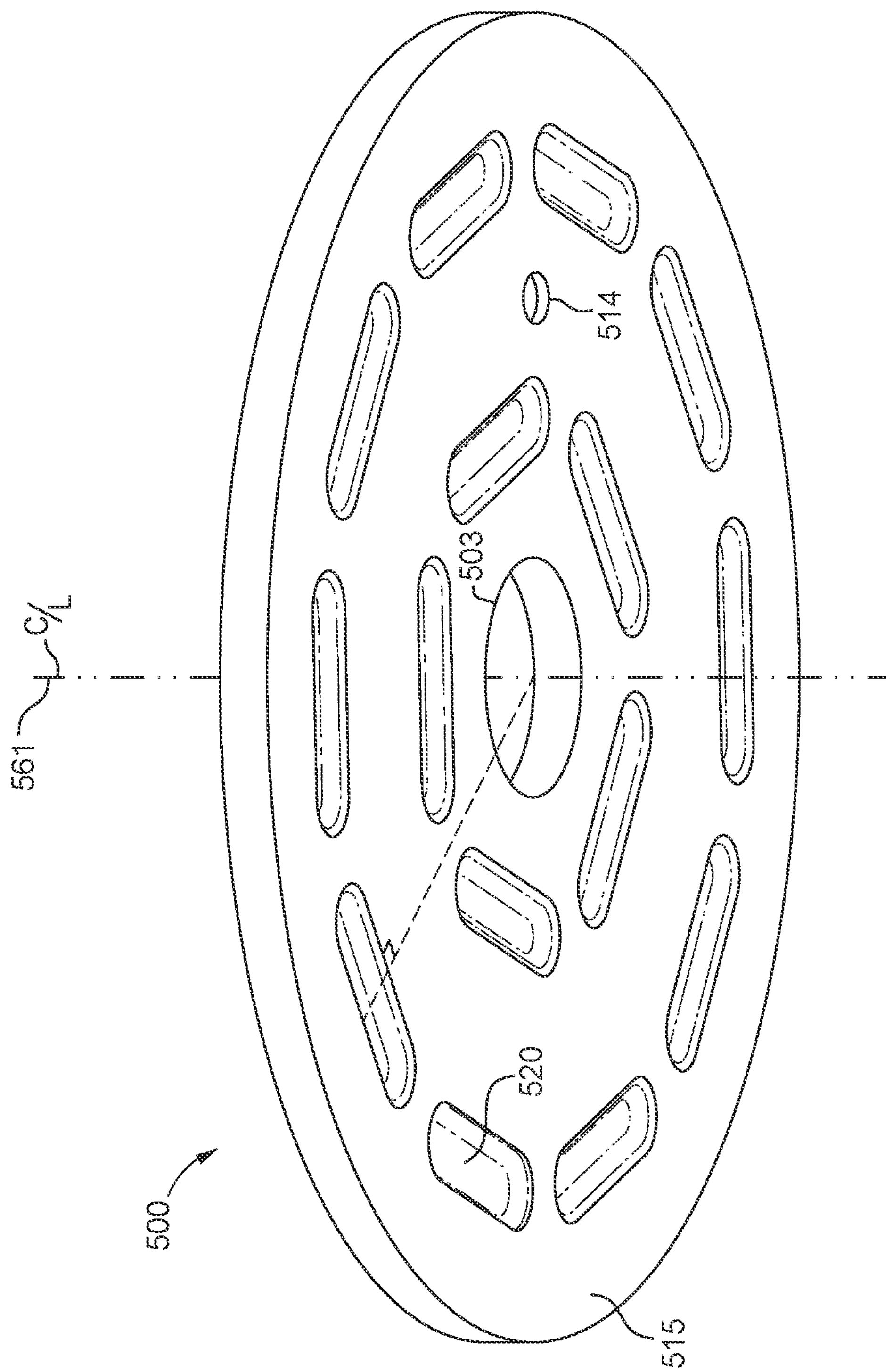
FIG. 5 is a bottom perspective view of a reflector to be used in the process chamber of FIG. 1, according to one embodiment of the disclosure.

FIG. 5 illustrates an embodiment of the reflector assembly 500 that includes a center hole 503 and a plurality of concave structures 520 configured to house a portion of an elongated lamp. The concave structures 520 are shown in an annular tangential orientation on the under surface 515 of reflector assembly 500 which can be used in the process chamber 100 of FIG. 1. The angle of the axis of elongation of each of the plurality of concave structures 520 is orientated at about 90 degrees relative to the radius of the reflector assembly 500. Thus, the concave structures 520 have a tangential orientation. However, the angle of the plurality of concave structures 520 may be arranged at other nonzero angle relative to the radius of the reflector assembly 500. In one embodiment, the plurality of concave structures 520 are arranged in a polar array in a common diameter outward of a centerline 561 of the cylindrical body. The reflector assembly 500 may be manufactured by polymer materials such as, but not limited to, polyether ether ketone ("PEEK"), polyimide, or other suitable high temperature polymers using suitable polymer shaping methods such as, casting, injection molding, compression molding (e.g., pressed powder), and 3D printing (additive manufacturing) and coated with a reflective material such as, gold and aluminum, among others. The center hole 503 and the cut out 514 may be used to enable the upper temperature sensor 192 and/or other sensor to monitor the substrate 160 shown in FIG. 1.

Figure 6:
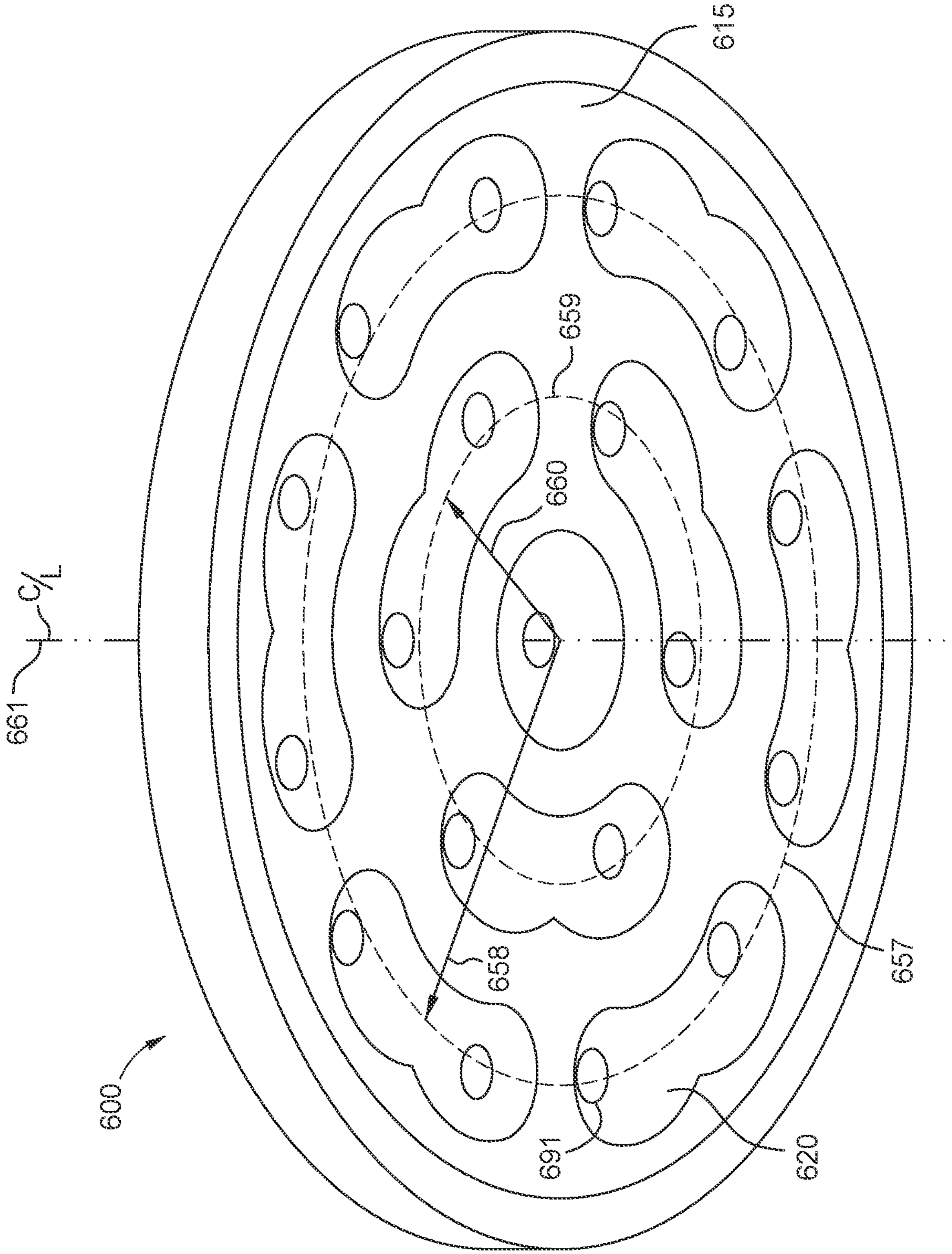
FIG. 6 is a bottom perspective view of a reflector to be used in the process chamber of FIG. 1, according to another embodiment of the disclosure.

FIG. 6 illustrates an embodiment of the reflector assembly 600 that includes a bottom surface 615 of a cylindrical body with a plurality of concave structures 620 illustrated as elephant ear shaped structures arranged in a polar array along common diameters 657, 659, and a lamp socket 691 within the elephant ear shaped structures. The elephant ear shaped structures may house at least one lamp socket 691 per elephant ear portion. The lamp socket 691 are typical lamp connectors to electrically power lamps (not shown in FIG. 6) used for process chambers in FIG. 1. In one embodiment, the plurality of concave structures 620 have three elephant ear shaped structures aligned in a polar array along a common inner diameter 659 at inner radial distance 660 and five elephant ear shaped structures aligned in a polar array along a common outer diameter 657 at outer radial distance 658 from the centerline 661 of the cylindrical body of the reflector assembly 600. Other embodiments may contain more or less elephant ear shaped structures as shown in FIG. 6 aligned in a polar array along common diameters 657, 659. In another embodiment, the elephant ear shaped structures are nested in alignment. The nested arrangement may be described as the outer portion of each elephant ear shaped structure being straddled by a second elephant ear shaped structure aligned radially outward of the inner elephant ear shaped structure. Therefore, each elephant ear shaped structure may be straddled by two separate elephant ear shaped structures. In another embodiment, the reflector assembly 600 may have cut outs to enable the upper temperature sensor 192 and/or other sensor to monitor the substrate 160 as shown in FIG. 1. The reflector assembly 600 may be manufactured by polymer materials such as, but not limited to, polyether ether ketone ("PEEK"), polyimide, or other suitable high temperature polymers using suitable polymer shaping methods such as, casting, injection molding, compression molding (e.g., pressed powder), and 3D printing (additive manufacturing) and coated with a reflective material such as, gold and aluminum, among others.

While the foregoing is directed to embodiments of the present disclosure, other and further embodiments of the disclosure may be devised without departing from the basic scope thereof, and the scope thereof is determined by the claims that follow.

What is claimed is:

1. A light reflector for use in a semiconductor processing chamber, the reflector comprising:

a cylindrical body having an upper surface and a lower surface, the lower surface having a plurality of concave reflector structures disposed around a centerline of the cylindrical body, wherein the cylindrical body is made from a polymer;

a shell extending through the cylindrical body and projecting below the lower surface to a distal end, wherein the shell is made from a second polymer, wherein the polymer and the second polymer are combined with a filler that improves thermal conductivity of the polymer and the second polymer, the filler including one or more of boron nitride, aluminum nitride, silicon carbide, carbon-based structures, diamond, or metal powder;

a cooling channel disposed in or on the cylindrical body; and a reflective coating disposed on the plurality of concave reflector structures.

2. The reflector of claim 1, wherein the plurality of concave structures are radially aligned outward of a centerline of the cylindrical body.

3. The reflector of claim 1, wherein the plurality of concave structures are arranged in polar array in a common diameter.

4. The reflector of claim 1, wherein the cooling channel is embedded in the body having an inlet and an outlet port disposed through the upper surface or a side surface of the cylindrical body.

5. The reflector of claim 1, wherein the shell and the cylindrical body are formed from a single mass of material.

6. The reflector of claim 1, wherein the shell further comprise a cooling channel.

7. The reflector of claim 1, further comprising:

a baffle coupled to the distal end of the shell.

8. The reflector of claim 7, wherein the shell and the baffle are formed from a single mass of material.

9. The reflector of claim 7, wherein a gap is defined between the distal end of the shell and the baffle.

10. The reflector of claim 1, wherein the reflective coating comprises a coating thickness selected to provide reflectance of 90% or more.

11. The reflector of claim 1, wherein the reflective coating is gold or aluminum.

12. The reflector of claim 11, further comprising a protective magnesium fluoride layer disposed on top of the reflective coating.

13. The reflector of claim 1, wherein the polymer selected is PEEK or polyimide.

14. A processing chamber applicable for use in semiconductor manufacturing, comprising:

a chamber body having an internal volume;

a plurality of lamps;

a substrate support disposed in the internal volume, the substrate support comprising a support surface;

a window disposed over the substrate support and at least partially bounding the internal volume;

a reflector positioned to reflect light emitted from the lamps through the window and into the internal volume, the reflector comprising:

a cylindrical body having an upper surface and a lower surface, the lower surface having a plurality of concave reflector structures disposed around a centerline of the cylindrical body, wherein the cylindrical body is constructed from a polymer;

a shell extending through the cylindrical body and projecting below the lower surface to a distal end, wherein the shell is made from a second polymer, wherein the polymer and the second polymer are combined with a filler that improves thermal conductivity of the polymer and the second polymer, the filler including one or more of boron nitride, aluminum nitride, silicon carbide, carbon-based structures, diamond, or metal powder;

a cooling channel disposed in or on the cylindrical body; and a reflective coating disposed on the plurality of concave reflector structures.

15. The processing chamber of claim 14, wherein the reflective coating is gold or magnesium fluoride coated aluminum.

16. The processing chamber of claim 14, further comprising a cooling channel disposed within the cylindrical body.

17. A processing chamber applicable for use in semiconductor manufacturing, comprising:

a chamber body having an internal volume;

a plurality of lamps;

a substrate support disposed in the internal volume, the substrate support comprising a support surface;

a window disposed over the substrate support and at least partially bounding the internal volume;

a reflector positioned to reflect light emitted from the lamps through the window and into the internal volume, the reflector comprising:

a cylindrical body having an upper surface and a lower surface, the lower surface having a plurality of concave reflector structures disposed around a centerline of the cylindrical body, the cylindrical body is made from a polymer;

a shell extending through the cylindrical body and projecting below the lower surface to a distal end, the shell is made from a second polymer;

wherein the polymer and the second polymer are combined with a filler that improves thermal conductivity of the polymer and the second polymer, the filler including one or more of boron nitride, aluminum nitride, silicon carbide, carbon-based structures, diamond, or metal powder; and a baffle coupled to the distal end of the shell, a cooling channel disposed in or on the cylindrical body, a second cooling channel disposed in or on the shell, each cooling channel having an inlet and an outlet port disposed through the upper surface or a side surface of the cylindrical body and shell; and a reflective coating disposed on the plurality of concave reflector structures, the reflective coating is gold or aluminum.

* * * * *